United States Patent
Shukla et al.

(10) Patent No.: US 12,081,526 B2
(45) Date of Patent: Sep. 3, 2024

(54) DATA STORAGE DEVICE DATA RECOVERY USING REMOTE NETWORK STORAGE

(71) Applicant: Western Digital Technologies, Inc., San Jose, CA (US)

(72) Inventors: Arun Kumar Shukla, Bangalore (IN); Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 585 days.

(21) Appl. No.: 17/324,706

(22) Filed: May 19, 2021

(65) Prior Publication Data

US 2022/0377054 A1   Nov. 24, 2022

(51) Int. Cl.
*H04L 9/40* (2022.01)
*G06F 3/06* (2006.01)
*H04L 9/32* (2006.01)
*H04L 67/1097* (2022.01)

(52) U.S. Cl.
CPC ........ *H04L 63/0428* (2013.01); *G06F 3/0623* (2013.01); *G06F 3/0659* (2013.01); *G06F 3/067* (2013.01); *H04L 9/3226* (2013.01); *H04L 63/08* (2013.01); *H04L 63/102* (2013.01); *H04L 67/1097* (2013.01)

(58) Field of Classification Search
CPC ... H04L 63/0428; H04L 9/3226; H04L 63/08; H04L 63/102; H04L 67/1097; G06F 3/0623; G06F 3/0659; G06F 3/067
USPC ........................................................ 713/168
See application file for complete search history.

(56) References Cited

U.S. PATENT DOCUMENTS

| | | | |
|---|---|---|---|
| 7,383,462 B2 | 6/2008 | Osaki et al. | |
| 8,612,707 B2 * | 12/2013 | Prahlad | G06F 11/1464 707/610 |
| 9,330,245 B2 | 5/2016 | Maron | |
| 9,733,849 B2 | 8/2017 | O'Hare et al. | |
| 11,210,183 B2 | 12/2021 | Navon et al. | |
| 2005/0041459 A1 * | 2/2005 | McDonald | G06K 7/0073 365/154 |
| 2007/0300101 A1 | 12/2007 | Stewart | |
| 2008/0126578 A1 * | 5/2008 | Krithivas | H04L 9/40 710/4 |
| 2008/0183882 A1 * | 7/2008 | Flynn | G06F 3/065 711/E12.04 |

(Continued)

OTHER PUBLICATIONS

International Search Report and Written Opinion for International Application No. PCT/US2022/016762, mailed Jul. 13, 2022, 9 pgs.

*Primary Examiner* — Dant B Shaifer Harriman
(74) *Attorney, Agent, or Firm* — Patent Law Works LLP

(57) ABSTRACT

Systems, methods, and data storage devices for data recovery from network storage systems are described. The data storage device may include a host data channel for data transfer with the host and a network data channel for data transfer with the network storage system over a network. Responsive to a read error when reading a data unit, the data storage device establishes a secure data transfer connection with the network storage system to request the failed data unit from the network storage system. The data unit retrieved from the network storage system may be used to respond to the original read request and restore the data unit in the data storage device.

20 Claims, 7 Drawing Sheets

(56) References Cited

U.S. PATENT DOCUMENTS

| | | | |
|---|---|---|---|
| 2009/0125671 A1* | 5/2009 | Flynn | G06F 11/1008 |
| | | | 711/170 |
| 2010/0161981 A1* | 6/2010 | Dodgson | G06F 21/80 |
| | | | 713/168 |
| 2011/0154023 A1* | 6/2011 | Smith | H04L 9/321 |
| | | | 713/168 |
| 2012/0278579 A1* | 11/2012 | Goss | G06F 12/0246 |
| | | | 711/E12.002 |
| 2013/0238553 A1 | 9/2013 | Kim et al. | |
| 2015/0058658 A1* | 2/2015 | Izuta | G06F 11/2007 |
| | | | 714/57 |
| 2017/0344280 A1* | 11/2017 | Borlick | G06F 3/067 |
| 2019/0155519 A1* | 5/2019 | Breakstone | G06F 3/0665 |
| 2019/0377650 A1* | 12/2019 | Nguyen | G06F 3/0619 |
| 2022/0020018 A1* | 1/2022 | Jivanyan | H04L 9/3073 |
| 2022/0020098 A1* | 1/2022 | De Vos | G06Q 20/027 |

* cited by examiner

DATA STORAGE DEVICE DATA RECOVERY USING REMOTE NETWORK STORAGE

TECHNICAL FIELD

The present disclosure generally relates to data recovery in data storage devices and, more particularly, to recovering unreadable data from another storage device.

BACKGROUND

Data storage devices, such as disk drives (solid-state drives, hard disk drives, hybrid drives, tape drives, etc.), universal serial bus (USB) flash drives, secure digital (SD) cards and SD extended capacity (SDXC) cards, and other form factors, may be used for storing data on behalf of a host, host system, or host device. These storage devices may include integrated storage devices built into the enclosure of the host device, removable storage devices mating with the host device through a physical interface connector (directly or through an interface cable), and network storage devices communicating with the host device using network protocols over a wired or wireless network connection. Some removable storage devices and/or network storage devices may use short range wireless communication, such as Bluetooth, ultra-wideband (UWB), Wi-Fi, Zigbee, etc., for communication with a host device or network. Storage devices may be integrated into storage systems that vary from single storage devices directly supporting a host device through a peripheral storage interface to multi-device storage systems (often supporting multiple host systems) that include multiple storage devices arranged in an array of drives interconnected by a common communication fabric and, in many cases, controlled by a storage controller, redundant array of independent disks (RAID) controller, or general controller, for coordinating storage and system activities across the array of drives.

In some systems, data storage devices may implement error correction codes (ECC) and other internal processes, such as retries and heroic recovery modes (generally varying physical read parameters in an attempt to recover otherwise unreadable data) for recovering bit errors in the data written to that storage device's storage medium. For example, hard disk drives, solid state drives, and other storage devices may implement low density parity check codes (LDPC) to provide a desired level of data recovery up to a determined recoverable bit error rate threshold. In addition, some storage devices may implement recovery retry schemes, including heroic error recovery modes that may include varying physical read parameters (e.g., read voltages, timing, etc.), in additional attempts to recover host data where the initial host data read exceeded the recovery capabilities of the ECC. These additional recovery modes generally require additional time and processor use by the storage device and may adversely affect latency, input/output operation rate, and quality of service metrics. When a data storage device's methods of recovering data from its storage medium are exhausted for a data block with read errors beyond the ECC capabilities, an unrecoverable ECC error (UECC) may be returned by the storage device to the host system to let it know that the stored data cannot be read from the storage medium.

For many applications and data types, some level of unrecoverable data loss may be acceptable and addressed through host system backups, redundancy, RAID schemes, etc. Storage servers and storage appliances may be expressly configured to compensate for the failure of one or more individual data storage devices using various RAID and backup schemes. However, edge storage devices, including removable storage devices such as flash drives and storage cards, may not have the benefit of such configurations. Even if the host device is configured with a backup solution for the removable storage, such backup schemes are generally managed at the host data or file system level and may be subject to less reliable service terms and user configurations.

For some applications, subsets of application data, critical system data, and/or storage device configuration data, loss of any data may be problematic and may benefit from additional data recovery options. Backup of data at the host system level, even to a network storage system, such as a cloud storage service, may not be sufficient for protecting such high value data. A reliable process for protecting data that is within the control of the data storage device but provides redundancy through a network storage system may be needed.

SUMMARY

Various aspects for data storage device data recovery, particularly use of network storage systems by the data storage device to respond to read errors through a network data channel, are described.

One general aspect includes a data storage device that includes: a storage medium; a host data channel configured for data transfer with a host system; a network data channel configured for data transfer with a network storage system over a network; and a storage device controller, including a processor and memory. The storage device controller is configured to: determine a read request for a target data unit; determine, responsive to attempting to read the target data unit from the storage medium, a read error for the target data unit; establish a secure data transfer connection to the network storage system over the network data channel; request, over the secure data transfer connection, the target data unit from the network storage system; receive, over the secure data transfer connection, the target data unit from the network storage system; rewrite the target data unit to the storage medium; and return, responsive to the read request and the received target data unit, the target data unit.

Implementations may include one or more of the following features. The storage device controller may be further configured to: store device credentials for authenticating access to the network storage system; and store encryption credentials for establishing the secure data transfer connection. Establishing the secure data transfer connection may include: reading the encryption credentials; initiating, using the encryption credentials, the secure data transfer connection with the network storage system; reading the device credentials; and sending the device credentials to the network storage system to authenticate access to the target data unit stored in the network storage system. The device credentials and the encryption credentials may be stored in a device configuration partition in the storage medium. The storage device controller may be further configured to store a network address for the network storage system. A storage device driver for the data storage device may be configured to establish the secure data transfer connection using a network interface of the host system. The data storage device may further include a network interface to the network for the network data channel, where the network data channel is different than the host data channel and establishing the secure data transfer connection with the network storage system bypasses the host system. The storage controller may be further configured to: store data units to the storage medium in erase blocks; and selectively replicate data units in erase blocks to the network storage system. Requesting the target data unit from the network storage system may include requesting a target erase block that includes at least a portion of the target data unit. The read request may be a host read request, the target data unit may be a host data unit, and the storage controller may be further configured to return, responsive to the read request and the received target data unit, the received target data unit to the host system prior to rewriting the target data unit to the storage medium. Establishing the secure data transfer connection may fail at a first time and the first time may be responsive to the read request. The storage controller may be further configured to: set, responsive to failing to establish the secure data transfer connection at the first time, a recovery indicator for the target data block; establish, at a second time after the first time, the secure data transfer connection; and initiate, responsive to establishing the secure data transfer connection at the second time, the request for the target data unit from the network storage system. The storage device controller may be further configured to: determine a high protection partition in the storage medium; determine a write request for the target data unit in the high protection partition; store the target data unit in the high protection partition in the storage medium; and replicate, responsive to establishing the secure data transfer connection, the target data unit to the network storage system.

Another general aspect includes a computer-implemented method that includes: configuring a data storage device for data transfer with a host system over a host data channel, where the data storage device includes a storage medium; determining, by the data storage device, a read request for a target data unit stored in the storage medium; determining, by the data storage device and responsive to attempting to read the target data unit from the storage medium, a read error for the target data unit; establishing, from the data storage device, a secure data transfer connection to a network storage system over a network data channel; requesting, by the data storage device and over the secure data transfer connection, the target data unit from the network storage system; receiving, by the data storage device and over the secure data transfer connection, the target data unit from the network storage system; rewriting, by the data storage device, the target data unit to the storage medium; and returning, responsive to the read request and the received target data unit, the target data unit.

Implementations may include one or more of the following features. The computer-implemented method may include: storing, by the data storage device, device credentials for authenticating access to the network storage system; storing, by the data storage device, encryption credentials for establishing the secure data transfer connection; reading, by the data storage device, the encryption credentials; initiating, by the data storage device and using the encryption credentials, the secure data transfer connection with the network storage system; reading, by the data storage device, the device credentials; and sending, by the data storage device, the device credentials to the network storage system to authenticate access to the target data unit stored in the network storage system. The computer-implemented method may include: storing, by the data storage device, a network address for the network storage system; and sending, by the data storage device, a connection request to the network address for the network storage system. The computer-implemented method may include configuring a storage device driver to establish the secure data transfer connection using a network interface of the host system. The computer-implemented method may include configuring a network interface of the data storage device for the network data channel, where the network data channel is different than the host data channel and establishing the secure data transfer connection with the network storage system bypasses the host system. The computer-implemented method may include: storing, by the data storage device, data units to the storage medium in erase blocks; and selectively replicating, by the data storage device, data units in erase blocks to the network storage system, where requesting the target data unit from the network storage system includes requesting a target erase block that includes at least a portion of the target data unit. The computer-implemented method may include returning, by the data storage device and responsive to the received target data unit, the received target data unit to the host system prior to rewriting the target data unit to the storage medium, where the read request is a host read request and the target data unit is a host data unit. The computer-implemented method may include: failing, by the data storage device at a first time, to establish the secure data transfer connection, where the first time is responsive to the read request; setting, by the data storage device and responsive to failing to establish the secure data transfer connection at the first time, a recovery indicator for the target data block; establishing, by the data storage device and at a second time after the first time, the secure data transfer connection; and initiating, by the data storage device and responsive to establishing the secure data transfer connection at the second time, the request for the target data unit from the network storage system. The computer-implemented method may include: determining, by the data storage device, a high protection partition in the storage medium; determining, by the data storage device, a write request for the target data unit in the high protection partition; storing, by the data storage device, the target data unit in the high protection partition in the storage medium; and replicating, by the data storage device and responsive to establishing the secure data transfer connection, the target data unit to the network storage system.

Still another general aspect may include a system that includes a host system, a network storage system, and a data storage device that includes: a storage medium; a host data channel configured for data transfer with the host system; and a network data channel configured for data transfer with the network storage system over a network. The system also includes: means for determining, in the data storage device, a read request for a target data unit from the host system; means for determining, in the data storage device and responsive to attempting to read the target data unit from the storage medium, a read error for the target data unit; means for establishing a secure data transfer connection to the network storage system over the network data channel; means for requesting, over the secure data transfer connection, the target data unit from the network storage system; means for receiving, over the secure data transfer connection, the target data unit from the network storage system; means for rewriting, by the data storage device, the target data unit to the storage medium; and means for returning, responsive to the read request and the received target data unit, the target data unit.

The various embodiments advantageously apply the teachings of data storage devices and/or storage systems to improve the functionality of such computer systems. The various embodiments include operations to overcome or at least reduce the issues previously encountered in storage systems and, accordingly, are more reliable than other computing systems. That is, the various embodiments disclosed herein include hardware and/or software with functionality to improve data storage device data recovery, such as by the data storage device using network storage systems to respond to read errors without host system intervention. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
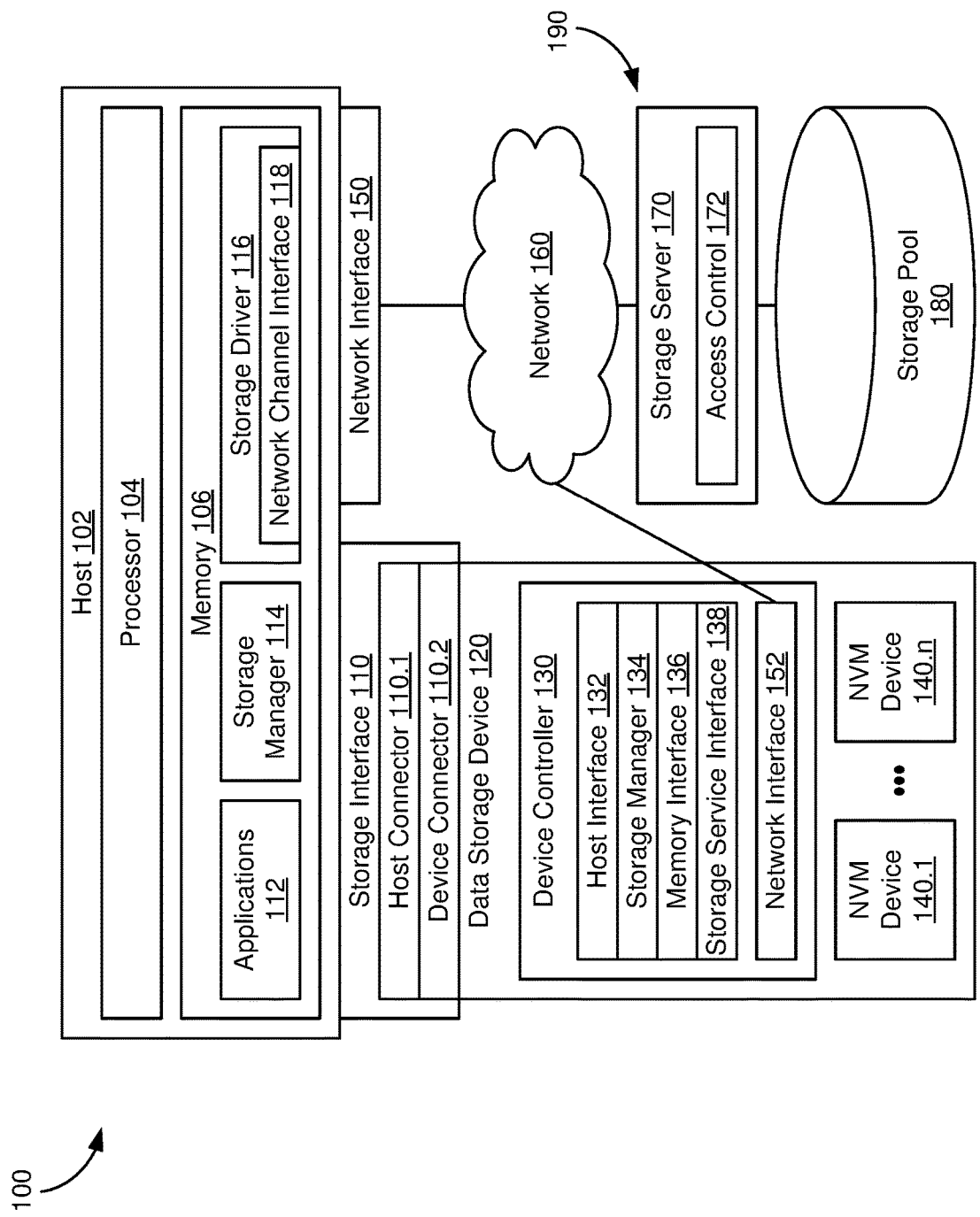
FIG. 1 schematically illustrates an example storage system with host device, a data storage device, and a network storage system.

FIG. 1 shows an embodiment of an example data storage system 100 with a data storage device 120 interconnected by a storage interface 110 to host device 102. Host device 102 and/or data storage device 120 may connect to network 160 to communicate with a network storage system 190 that includes storage server 170 and storage pool 180. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, disk drives, or drives) in communication with one or more host devices 102. In some embodiments, host device 102 may be a user device with an embedded computing system, such as video camera, mobile phone, tablet computer, smart television, smart appliance, portable game device, printer, or other consumer electronic device. In some embodiments, storage device 120 may be a removable storage device, such as a universal serial bus (USB) flash drive, secure digital (SD) card, extended capacity (SDXC) SD card, or other removable storage device.

In the embodiment shown, storage device 120 is attached to storage interface 110 for host communication with host device 102. For example, host device 102 may include a host connector 110.1, such as a peripheral component interface express (PCIe) connector, USB slot, memory card slot/reader (for Memory Stick, MultiMedia Card, SD, SDXC, etc. memory cards), etc., that provides a physical connector configured to mate with a corresponding storage device connector 110.2. In some embodiments, host connector 110.1 may define a slot or port providing a wired internal connection to a host bus or storage interface controller. In some embodiments, device connector 110.2 may include a portion of a storage device housing or projection therefrom that removably inserts into the slot or port in host connector 110.1 to provide a physical attachment and electrical connection for host-device communication. In some embodiments, an intervening wire, extender, switch, or similar device compatible with host connector 110.1 and device connector 110.2 may be inserted between host connector 110.1 and device connector 110.2 without materially changing the host-device interface or operation of storage interface 110.

In some embodiments, storage interface 110 may be configured to use network communication protocols. Host connector 110.1 and device connector 110.2 may include any type of physical connector compatible with one or more network and/or internet protocols. For example, host connector 110.1 and device connector 110.2 may include ethernet, PCIe, Fibre Channel, small computer serial interface (SCSI), serial attached SCSI (SAS), or another network-capable interface. Storage interface 110 may include or interconnect with a plurality of physical port connections and intermediate components that define physical, transport, and other logical channels for establishing communication with the different components and subcomponents for establishing a communication channel between host device 102 and storage device 120. In some embodiments, storage interface 110 may provide a primary host interface for storage device management and host data transfer, as well as a control interface that includes limited connectivity to the host for low-level control functions, such as through a baseboard management controller (BMC).

In some embodiments, data storage device 120 is, or includes, a solid-state memory device. Data storage device may include a non-volatile memory (NVM) or storage device controller 130 based on compute resources (processor and memory) and a plurality of NVM or media devices 140 for data storage (e.g., one or more NVM device(s), such as one or more flash memory devices). In some embodiments, storage device controller 130 may include a host interface controller 132, a host storage manager 134, and one or more memory interface controllers 136. For example, host interface controller 132 may include a physical subsystem, such as an application specific integrated circuit (ASIC) or system on a chip (SOC), and/or logic or firmware running on the general compute resources of storage device controller 130 for configuring and controlling communication with host device 102 over storage interface 110. Host storage manager 134 may include configuration, background, and storage processing operations running on the general compute resources of storage device controller 130 to coordinate operation of storage device 120, host interface controller 132, and memory interface controller 136. Memory interface controller 136 may include a physical memory bus and related resources for connecting to media devices 140.1-140.n, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors, such as device connector 110.2, for interconnecting with storage interface 110.

In some embodiments, data storage device 120 may include a storage service interface 138 configured to access the network storage system through storage server 170 to recover data units that cannot be read from media devices 140. For example, storage service interface 138 may selectively replicate data units to storage pool 180 through storage server 170 and, in the event of a read error, such as an unrecoverable error correction code (UECC) error, recover the previously replicated data unit from storage server 170. In some embodiments, storage service interface 138 may include or access a service or functions within storage manager 134 that integrates with read error handling in the data read path and provides an additional option for addressing UECCs prior to notifying host device 102 of the read error. In the event of a read error, storage service interface 138 may establish a secure data transfer connection with storage server 170, request one or more data units determined to be unreadable from media devices 140, and receive the requested data units from storage server 170. In some embodiments, storage service interface 138 may also be configured to selectively replicate data units stored to media devices 140 to storage server 170 for storage in storage pool 180, making them available for later recovery operations.

In some embodiments, storage service interface 138 may be configured to establish the secure data transfer connection with storage server 170 through network 160 by establishing a network data channel that is separate and different from the host data channel for transferring host data to and from host device 102. For example, host data transfer may be based on a standard storage protocol, such as NVMe, while the network data channel may enable communication via transport connection protocol/internet protocol (TCP/IP), hypertext transfer protocol (HTTP), and similar internet communication standards to network addresses complying with the internet domain name system (DNS). In some embodiments, data storage device 120 may include a network interface that includes a wired or wireless connection to network 160, enabling storage service interface 138 to establish a secure data transfer connection to storage server 170 while bypassing host device 102 and not utilizing the hardware or software resources of host device 102. For example, device controller 130 may include an onboard wireless network interface configured to establish a wireless connection to network 160 based on device credentials for network access and security. The device credentials may further include service authentication credentials, such as a unique device identifier (or username), password, and/or security certificate for the storage services provided by storage server 170. For example, storage server 170 may include access control 172 configured to require predetermined security standards, such as HTTP secure (HTTPS), and login credentials before processing a read request. In some embodiments, as further described with regard to storage driver 116, storage service interface 138 may use a network data channel through host device 102. For example, data storage device 120 may not include its own network interface 152 and may be configured to use network interface 150 of host device 102 instead.

In some embodiments, data storage device 120 may include a single medium device while in other embodiments data storage device 120 includes a plurality of media devices. In some embodiments, media devices 140 may include NAND-type flash memory or NOR-type flash memory. In some embodiments, data storage device 120 may include one or more hard disk drives (HDDs). In some embodiments, data storage device 120 may include a flash memory device, which in turn includes one or more flash memory die, one or more flash memory packages, one or more flash memory channels, or the like. However, in some embodiments, data storage device 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, storage device 120 includes storage device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controller. Media devices 140 may be coupled to device controller 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage device 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations in storage device 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks. In some configurations, logical and/or physical zones may be assigned within storage device 120 as groups of data blocks allocated for specified host data management purposes.

In some embodiments, host, host system, or host device 102 may be coupled to network 160 through a network interface 150. In some embodiments, network 160 may operate over a wired and/or wireless network (e.g., public and/or private computer networks in any number and/or configuration) which may be coupled in a suitable way for transferring data. For example, network 160 may include any means of a conventional data communication network such as a local area network (LAN), a wide area network (WAN), a telephone network, such as the public switched telephone network (PSTN), an intranet, the internet, or any other suitable communication network or combination of communication networks.

Host device 102 may be any suitable computer device, such as a computer, a computer server, a laptop computer, a tablet device, a netbook, an internet kiosk, a personal digital assistant, a mobile phone, a smart phone, a gaming device, a smart appliance, a camera or video camera, consumer electronics device, or any other computing device. Host device 102 is sometimes called a host, host system, client, or client system, depending on respective roles, configurations, and contexts. In some embodiments, host device 102 is distinct from a storage controller, storage node, or storage interface component housing or receiving storage device 120. In some embodiments, host device 102 may be any computing device configured to store and access data in storage device 120.

Host device 102 may include one or more central processing units (CPUs) or processors 104 for executing compute operations or instructions for accessing storage devices 120 through storage interface 110. In some embodiments, processor 104 may be associated with operating memory 106 for executing both storage operations and a storage interface protocol compatible with storage interface 110 and storage device 120. In some embodiments, a separate storage interface unit (not shown) may provide the storage interface protocol and related processor and memory resources. From the perspective of storage device 120, storage interface 110 may be referred to as a host interface and provides a host data path between storage device 120 and host device 102.

Host device 102 may include memory 106 configured to support various data access and management functions, generally in support of one or more applications 112. Memory 106 may include a random access memory (RAM) or another type of dynamic storage device that stores information and instructions for execution by processor 104 and/or a read only memory (ROM) or another type of static storage device that stores static information and instructions for use by processor 104 and/or any suitable storage element such as a hard disk or a solid state storage element. For example, memory 106 may include one or more dynamic random access memory (DRAM) devices for use by host device 102 for command, management parameter, and/or host data storage and transfer to and from storage device 120. In some embodiments, storage devices 120 may be configured for direct memory access (DMA), such as using remote direct memory access (RDMA) protocols, over storage interface 110 to interact with host device 102.

In some embodiments, host device 102 may include one or more applications 112 instantiated in host memory 106 for execution by host processor 104. Applications 112 may include and/or be configured to access one or more storage management functions of storage manager 114. Storage manager 114 may include applications, services, libraries, and/or corresponding interfaces for managing the contents and operation of storage device 120 on behalf of host device 102. For example, storage manager 114 may include services for monitoring storage device parameters, such as total capacity, capacity used, and capacity available, tracking storage device input/output (I/O) history, performance, and workload, and initiating host storage maintenance functions, such as media scans, defragmentation, host data transfer or reorganization, etc. In some embodiments, storage manager 114 may configure and monitor storage device alerts and notifications for performance monitoring.

Storage manager 114 may include and/or be configured to access a storage driver 116 configured to manage communications with storage device 120 in accordance with a defined storage protocol supported by storage interface 110 and host and storage device configuration parameters. In some embodiments, storage driver 116 may be an operating system and/or firmware service or set of services configured to initialize, control, and manage communication through storage interface 110 to storage device 120. In some embodiments, storage driver 116 may be configured to use host compute resources (e.g., processor 104 and/or memory 106) and network interface 150 to enable a network channel interface 118 for storage device 120. For example, storage driver 116 may include a service or functions for receiving credentials and storage requests from storage service interface 138 to enable a network data channel between storage device 120 and storage server 170. In some embodiments, credentials and data requests from storage service interface 138 may be passed through storage interface 110 using device configuration messaging supported by storage driver 116. Storage driver 116 may receive the credentials and data requests, format them according to network communication standards, and forward them through network interface 150 using the network configuration of host device 102.

In some embodiments, network storage system 190 may be a cloud-based storage system supporting one or more data backup and recovery services. For example, storage server 170 may be a cloud server hosting a data backup and recovery application with a web, mobile application, or similar interface and storing service user data in storage pool 180. In some embodiments, storage pool 180 may be a distributed data storage system configured with redundant data storage devices providing data availability and redundancy to storage server 170. For example, storage pool 180 may include geographically distributed rack storage system configured in RAID groups and clusters for supporting various server-based applications, including storage server 170. In some embodiments, storage server 170 may be configured to receive and store data units from storage device 120 according to the media storage configuration, such as erase blocks, of storage device 120, rather than a host file system or host LBA configuration of host device 102. In some embodiments, credentials used by storage device 120 to navigate access control 172 of storage server 170 may identify and be assigned to storage device 120 without regard to host device 102 and may be unknown to host device 102 and/or a user thereof.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
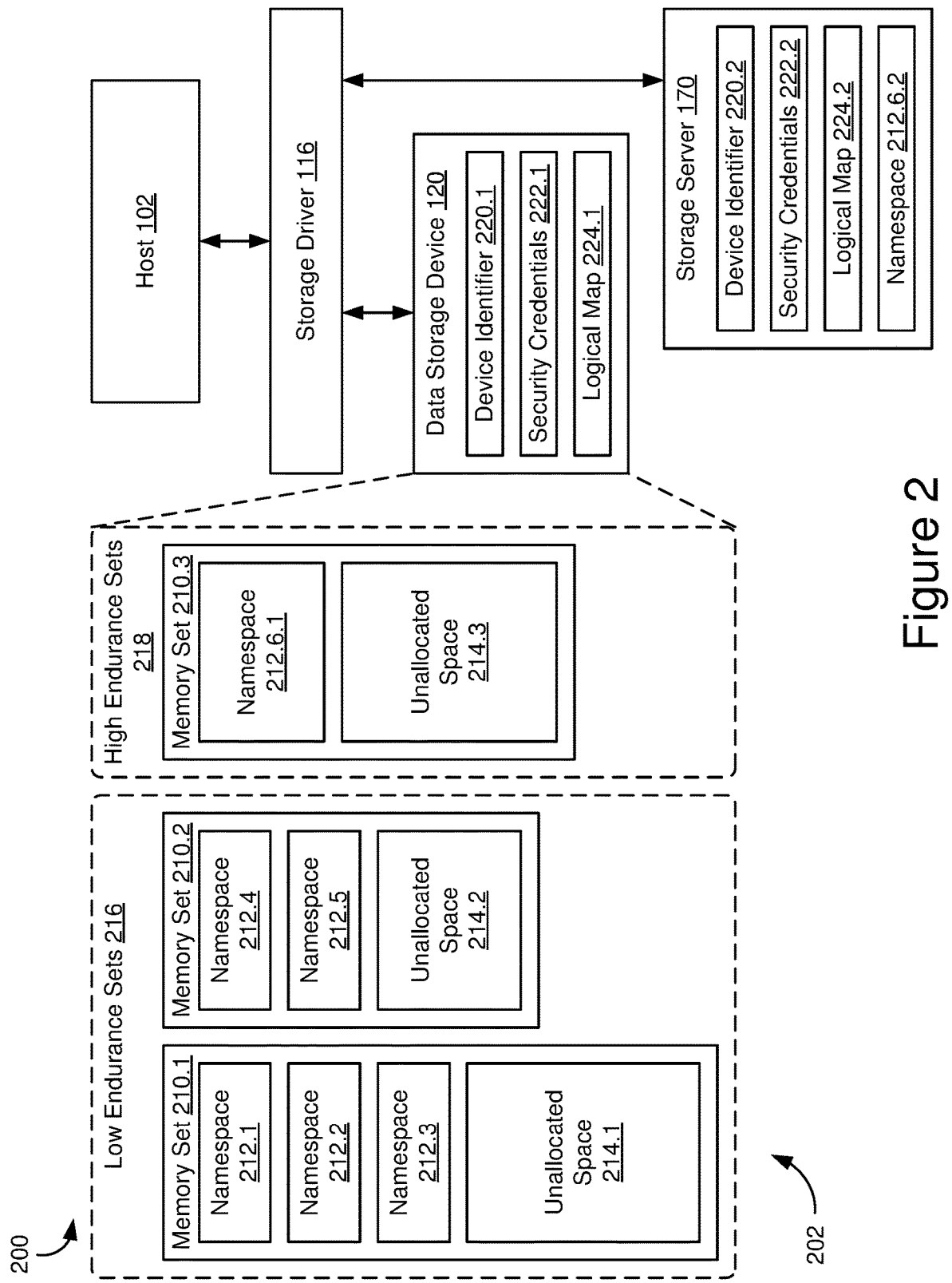
FIG. 2 schematically illustrates another example storage system with an example partition architecture.

FIG. 2 shows a schematic representation of a storage system 200 showing partitions 202 and configured with elements similar to storage system 100 of FIG. 1. Host device 102 may be configured for communication with storage device 120, such as through storage driver 116. Storage driver 116 may also enable storage device 120 to communicate with storage server 170. In some embodiments, storage driver 116 may be hosted in host device 102 (as shown in FIG. 1). In some embodiments, host device 102 may be used to configure partitions 202 in the storage medium of data storage device 120, such as media devices 140 in FIG. 1.

Partitions 202 may include any number of partitions defined by host device 102 and/or data storage device 120 for configuring storage space in the storage medium of data storage device 120. In the example shown, partitions 202 may include three memory sets 210.1-210.3. In some embodiments, each memory set 210 may correspond to a set of physical storage locations, such as particular media devices, groups of media devices, or subcomponents of media devices. Each memory set 210 may include one or more namespaces 212 defined in accordance with the storage protocol supported by storage driver 116, host device 102, and data storage device 120. For example, data storage device 120 may be a NVMe flash storage device and namespaces 212 may be defined in accordance with NVMe protocols. In the example shown, memory set 210.1 may be defined to include namespaces 212.1, 212.2, and 212.3 and an unallocated space 214.1; memory set 210.2 may be defined to include namespaces 212.4 and 212.5 and an unallocated space 214.2; and memory set 210.3 may be defined to include namespace 212.6.1 and unallocated 214.3. In some embodiments, partitions 202 may be classified according to the class of protection that data stored in those partitions will receive. For example, memory set 210.1 and memory set 210.2 may be assigned to low endurance set 216 and configured with standard data protections for data storage device 120. Memory set 210.3 may be assigned to high endurance set 218 and configured with a high protection configuration that is enabled for remote replication to and data recovery from storage server 170. In this way, data storage device 120 and/or host device 102 (and/or a user thereof) may determine the data protections of a given data unit based on the partition to which it is written. In some embodiments, storage device 120 may allocate high-value configuration and operating data, such as a device configuration space for internal device parameters that are hidden from host device 102, to high endurance sets 218 to provide the added protection of remote storage on storage server 170. Due to the additional processing, lag, and network resources for replicating data to storage server 170, data recovery using storage server 170 may be limited to only high endurance sets 218 or similar high value/priority partitions in some embodiments.

In some embodiments, data storage device 120 replicates namespace 212.6.1 to storage server 170 as namespace 212.6.2 for later use in data recovery. For example, each time host data is written to namespace 212.6.1, data storage device 120 may establish a secure data transfer connection with storage server 170, such as through storage driver 116, and replicate the new host data to storage server 170. In some embodiments, data storage device 120 may be configured with various credentials for accessing storage server 170. For example, data storage device 120 may include a device identifier 220.1 and security credentials 222.1. Storage server 170 may include corresponding device credentials for establishing the secure data transfer connection. For example, storage server 170 may include device identifier 220.2 and security credentials 222.2 that enable storage server 170 to authenticate data access, write, read, and erase requests from storage device 120. In some embodiments, storage device 120 may be configured with an authentication token that corresponds to device identifier 220.1 and security credentials 222.1 and may be used by storage server 170 to authenticate device identifier 220.2 and security credentials 222.2. In some embodiments, storage server 170 may support any number of remote data storage devices and use device identifiers and security credentials to assure that access to replicated data is limited to the correct data storage device.

In some embodiments, data storage device 120 may include a logical map 224.1 for locating data units in the physical media, such as logical-to-physical mapping tables (L2P tables). For example, host LBAs may be mapped to specific erase blocks and/or storage locations therein (data extents in terms of pages, lines, words, sectors, etc.). In some embodiments, data storage device 120 may replicate data from namespace 212.6.1 to namespace 212.6.1 using host logical mapping. In some embodiments, data storage device 120 may replicate data from namespace 212.6.1 to 212.6.2 using the physical mapping of its own storage media. For example, individual erase blocks may be the logical unit used to replicate data to storage server 170. In some embodiments, data storage device 120 may maintain logical map 224.1 for identifying the data units that have been replicated (and/or are waiting to be replicated) to storage server 170. From the perspective of storage server 170, data stored in namespace 212.6.2 may be received in logical units and storage server 170 may maintain a network logical map 224.2 to locate the logical units that it stores, such as in storage pool 180 in FIG. 1. By using the physical media device mapping (such as erase blocks) as the logical units for replication to storage server 170, storage device 120 may be enabled to selectively recover data units corresponding to failed physical storage elements without reference to the logical blocks or file structure of host device 102, which would likely result in recovering larger data units than the actual failure and unrecoverable data requires (and requiring additional resources and delay). In some embodiments, network logical map 224.2 may correspond to host LBAs to assist with returning the recovered host LBAs to host device 102 without requiring further processing by storage device 120 (and, in some embodiments, prior to restoring failed erase blocks in storage device 120).

Figure 3:
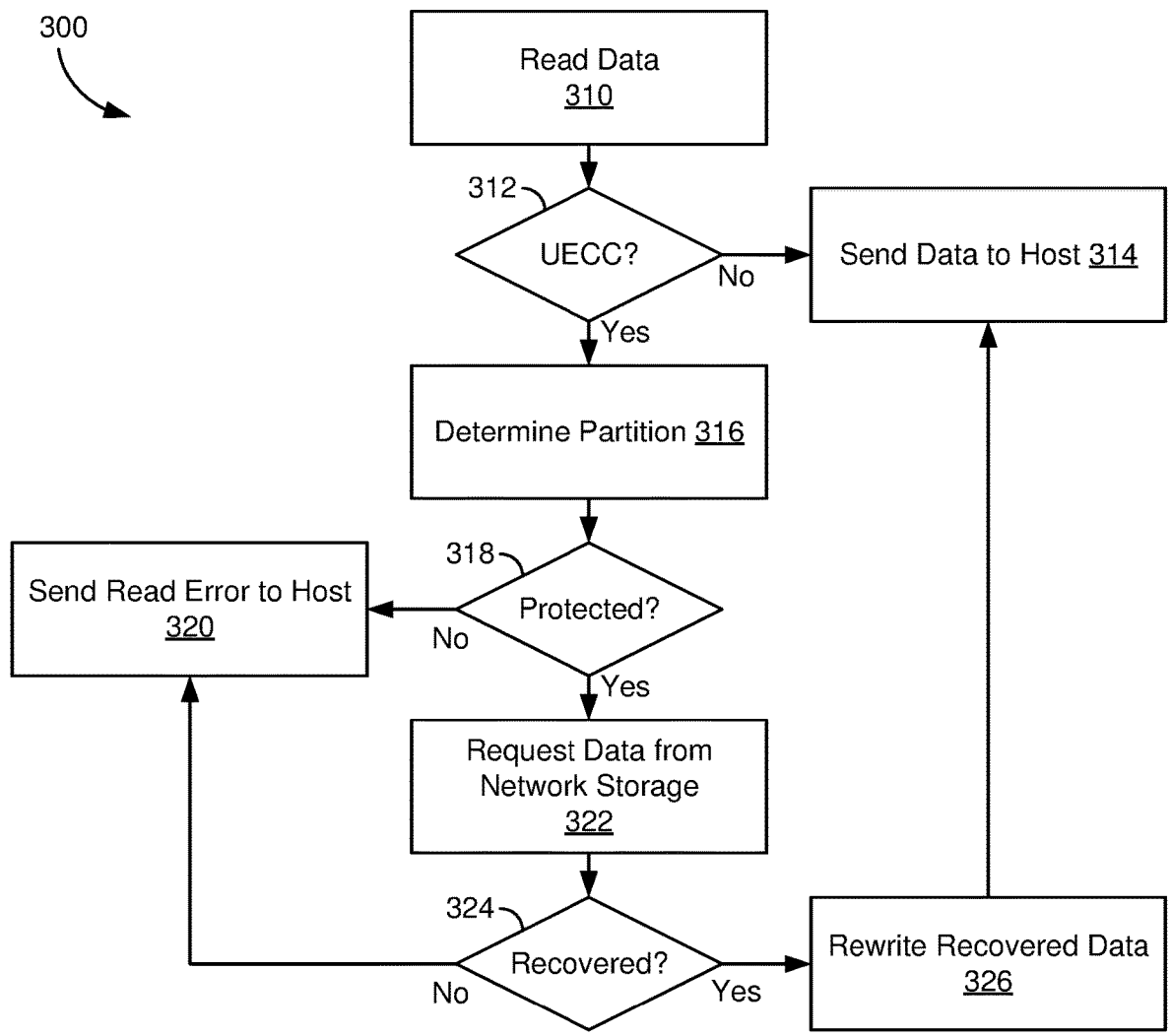
FIG. 3 is a flowchart of an example method of using a network storage system for data recovery by a data storage device.

FIG. 3 shows a method 300 of using a network storage system for data recovery by a data storage device. One or more blocks of method 300 may be implemented by a storage system, such as storage system 100 in FIG. 1 and/or storage system 200 in FIG. 2, using a storage device configured similarly to storage device 500 in FIG. 5. For example, storage device 500 may be operated according method 300, illustrated by blocks 310-326 of FIG. 3.

At block 310, the data storage device may attempt to read data from its storage medium. For example, the data storage device may receive and process a host read command or generate its own read command, such as to its own configuration partition or as part of background operations on host data (e.g., garbage collection, wear levelling, defragmentation, etc.).

At block 312, the data storage device may determine whether or not a read error, such as a UECC, has resulted from the read attempt. For example, a read operation may encounter an unrecoverable read error due to multiple read failures in an erase block, where one or more symbols cannot be recovered within the ECC capabilities of the device. If no UECC error is generated, method 300 may proceed to block 314. If a UECC error is generated, method 300 may proceed to block 316.

At block 314, the data storage device may return the read data to the host. For example, responsive to a host read command, the read operation may return the read data to a host transfer buffer for sending the read data to the host device via the host/storage interface.

At block 316, the data storage device may determine the partition from which the target data was being read. For example, each logical data unit and/or physical storage location may be associated with a particular partition and associated data protection scheme.

At block 318, the data storage device may determine whether or not the partition is protected using a network storage system backup copy of the unreadable data. For example, error handling logic in the storage device may check a flag, partition parameter, or other metadata for determining whether the data unit is allocated to a high protection partition, such as a high endurance group. If no, then method 300 may proceed to block 320. If yes, then method 300 may proceed to block 322.

At block 320, the data storage device may send a read error to the host. For example, the UECC may generate a read error notification to the host device in response to the read command.

At block 322, the data storage device may request the unrecoverable data from a network storage system. For example, the data storage device may establish a secure data transfer connection with the network storage system over a network interface and request the data unit corresponding to the unreadable data, such as the erase block that contained the unrecoverable symbol.

At block 324, the data storage device may evaluate whether the data can be recovered from the network storage system. For example, the data storage device may wait for a response to the read request, which may or may not be successful depending on whether the connection could be established, the storage device successfully authenticated, and the requested data was retrievable from the network storage system. If no, method 300 may proceed to block 320 and send the read error to the host. If yes, the method may proceed to block 326.

At block 326, the data storage device may rewrite the recovered data to its storage medium. For example, the data received from the network storage system may be written back to the same partition in a new physical location and the FTL for the host LBA may be updated. Method 300 may proceed to block 314 to send the data for the host read command to the host based on the recovered data (and, in some cases, data successfully read from the storage medium that is part of the same host data unit or request).

Figure 4:
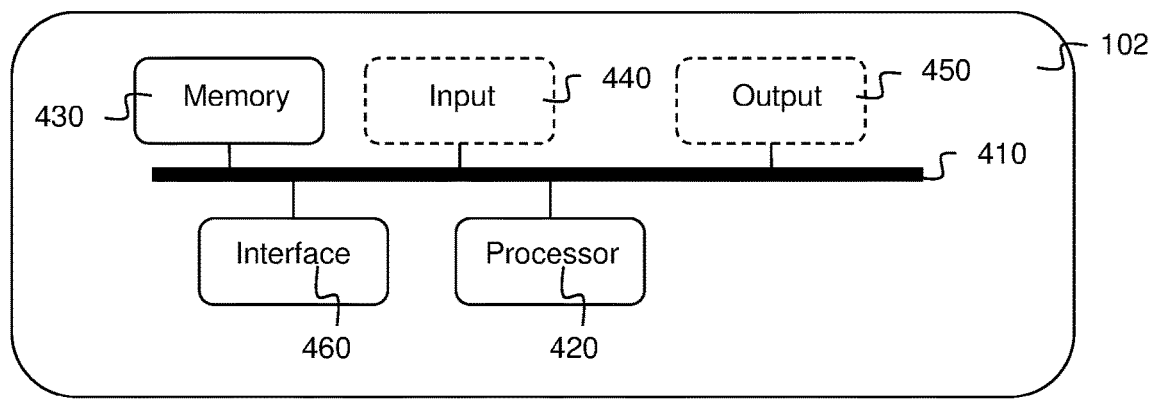
FIG. 4 schematically illustrates a host and/or server device of the storage system of FIGS. 1 and 2.

FIG. 4 shows a schematic representation of an example host device 102. The same schematic representation may also describe an example storage server 170. Host device 102 may comprise a bus 410, a host processor 420, a host memory 430, one or more optional input units 440, one or more optional output units 450, and a communication interface 460. Bus 410 may include one or more conductors that permit communication among the components of host 102. Processor 420 may include any type of conventional processor or microprocessor that interprets and executes instructions. Host memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. For example, applications 112, storage manager 114, and/or storage driver 116 may be instantiated in instructions, operations, or firmware stored in host memory 430 for execution by host processor 420.

An optional input unit 440 may include one or more conventional mechanisms that permit an operator to input information to host 102 such as a keyboard, a mouse, a pen, voice recognition and/or biometric mechanisms, etc. In some embodiments, optional input unit 440 may include image, audio, infrared, and/or other sensors for video camera or other consumer electronics functions. Optional output unit 450 may include one or more conventional mechanisms that output information to the operator, such as a display, a printer, a speaker, etc. Communication interface 460 may include any transceiver-like mechanism that enables host 102 to communicate with other devices and/or systems. In some embodiments, communication interface 460 may include one or more peripheral interfaces, such as a PCIe, USB, SD, SDXC, or other interface for connecting to storage device 120 and/or a network interface for communicating with storage device 120 over a fabric network.

Figure 5:
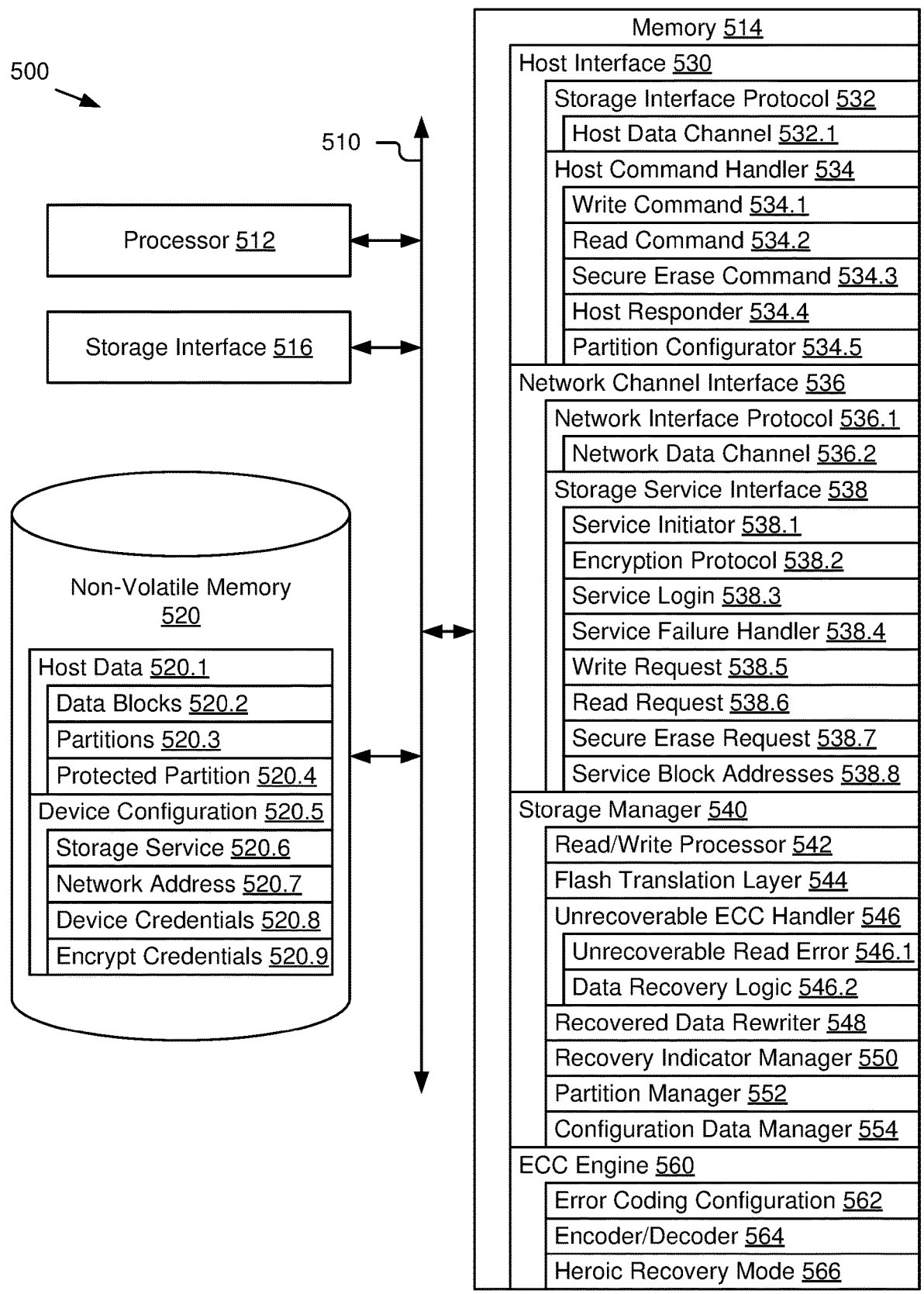
FIG. 5 schematically illustrates some elements of the data storage devices of FIGS. 1 and 2 in more detail.

FIG. 5 schematically shows selected modules of a storage device 500 configured for selective data replication and data recovery by establishing a secure data transfer connection with a network storage system. Storage device 500 may incorporate elements and configurations similar to those shown in FIGS. 1-2. For example, storage device 500 may be a storage device configured as storage device 120 in storage system 100, where the storage device 120 includes: bus 510, processor 512, memory 514 (instantiating host interface 530, network channel interface 536, storage manager 540, and ECC engine 560), and storage interface 516 in storage device controller 130; and non-volatile memory 520 in NVM devices 140.

Storage device 500 may include a bus 510 interconnecting at least one processor 512, at least one memory 514, and at least one interface, such as storage interface 516. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage interface 516 may include a physical interface for communication between a storage device and a host or client using an interface protocol that supports storage device access. For example, storage interface 516 may include a USB, SD, SDXC, PCIe, serial advanced technology attachment (SATA), serial attached small computer system interface (SCSI) (SAS), or similar storage interface connector supporting access to solid state media comprising non-volatile memory devices 520. In some embodiments, storage interface 516 may connect to or incorporate a network interface for connecting to a fabric network and/or other network. For example, storage interface 516 may connect to a network fabric interface through a backplane network and/or storage network interface controller supporting an NVMe-over-fabric (NVMeoF) protocol. In some embodiments, storage device 500, hosts, clients, and/or other components of the storage system may be configured as nodes in the NVMeoF topology and communicate using supported NVMe commands. In some embodiments, as shown with regard to storage device 120 in FIG. 1, storage device 500 may include a separate network interface that operates independently of storage interface 516 and enables storage device 500 to bypass storage interface 516 and a connected host device for establishing network communications. For example, storage device 500 may include wireless adapter and/or cellular transponder for directly accessing wireless network communications without the host device.

Storage device 500 may include one or more non-volatile memory devices 520 configured to store host data 520.1. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), triple-level cells (TLC), quad-level cells (QLC), penta-level cells (PLC), etc. In some embodiments, non-volatile memory devices 520 may include the storage medium of a storage device, such as NVM devices 140 in storage devices 120.

Storage device 500 may include a plurality of modules or subsystems that are stored and/or instantiated in memory 514 for execution by processor 512 as instructions or operations. For example, memory 514 may include a host interface 530 configured to receive, process, and respond to host data requests and/or management commands from client or host systems. Memory 514 may include a network channel interface 536 configured for establishing a secure data transfer connection with a network storage system over a network. In some embodiments, some functions of network channel interface 536 may be embodied in a storage driver that is hosted by the host device to enable use of a host network interface. Memory 514 may include a storage manager 540 configured to manage storage and management operations to the media devices comprising non-volatile memory 520. Memory 514 may include an ECC engine configured to encode and decode data written to non-volatile memory 520 and determine whether symbols stored in non-volatile memory 520 can be accurately read.

Host interface 530 may include an interface protocol and/or set of functions, parameters, and/or data structures for receiving, parsing, responding to, and otherwise managing host data requests from a host. For example, host interface 530 may include functions for receiving and processing host I/O requests for reading, writing, modifying, erasing, or otherwise manipulating data blocks and their respective client or host data and/or metadata in accordance with host communication and storage protocols. Host interface 530 may also support administrative commands and/or management operations initiated by the host or the storage device, such as configuration changes, garbage collection, log access, firmware management, reporting of operational parameters, notification of predicted performance change indicators, etc. For example, host interface 530 may support administrative command sets for configuring namespaces, queue control, log access, feature identification and configuration, security settings, and/or performance monitoring. In some embodiments, host interface 530 may enable direct memory access and/or access over NVMe protocols through storage interface 516. For example, host interface 530 may include host communication protocols compatible with USB, SD, SDXC, PCIe, SATA, SAS, and/or another bus interface.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage interface 516. For example, storage interface protocol 532 may include USB, SD, SDXC, PCIe, NVMe, and/or other protocol compliant communication, command, and syntax functions, procedures, and data structures for establishing host data channel 532.1. In some embodiments, host interface 530 may include a host command handler 534 configured to process the host commands received through storage interface protocol 532, initiate storage manager 540 for storage operations, and provide a response to the processed host commands. In some embodiments, host interface 530 may include additional modules (not shown) for buffer management, storage device configuration and management, and other host-side functions.

In some embodiments, storage interface protocol 532 defines a host data channel 532.1 for communication and data transfer between storage device 500 and a host system. For example, host data channel 532.1 may include command and data transfer protocols through storage interface 516 that enable transfer of data units to and from non-volatile memory 520 from and to the host device, often using transfer buffers on either or both of the storage device and host sides of the interface. In some embodiments, host data channel 532.1 may include a data transfer channel configured for efficient queuing and transfer of host data 520.1 and a separate host command channel for receiving host storage requests, such as host read requests, host write requests, and host erase requests, and administrative requests that may initiate data transfer through the data transfer channel.

In some embodiments, each request, command, or command type handled by host command handler 534 may include a distinct set of logical operations related to parsing command parameters related to the request or command and initiating further processing, such as by initiating one or more processes in storage manager 540. Host command handler 534 may be configured for receiving host data blocks and parsing related write command parameters for write command 534.1. Host command handler 534 may be configured for parsing read command parameters, including a host LBA identifying one or more host data blocks, for read command 534.2. Host command handler 534 may be configured for parsing erase command parameters, include a host LBA identifying one or more host data blocks, for secure erase command 534.3. Write command 534.1, read command 534.2, and secure erase command 534.3 may each parse their respective write parameters, read parameters, and/or erase parameters and pass them to respective processing paths in storage manager 540 for initiating corresponding storage operations against host data blocks 520.2 in non-volatile memory 520. In some embodiments, host command handler 534 may include a host responder 534.4 configured to maintain state information for pending host commands and corresponding storage operations and provide response messages to the requesting host device. For example, host responder 534.4 may monitor each write command 534.1, read command 534.2, and/or secure erase command 534.3 in one or more command queues and, upon completion of the corresponding storage operations by storage manager 540, send a command completion response to the host device. In some embodiments, host responder 534.4 may also be configured to return status messages at various stages of processing host commands, as well as sending error messages in the event that a host command cannot be completed. For example, host responder 534.4 may return an error message to the requesting host device for a read error (including UECC errors), command timeout, invalid or unsupported command parameters, etc.

In some embodiments, host command handler 534 may include or support a partition configurator 534.5 configured to enable the host device (and/or a user/administrator of the host device) to configure the partitions, volumes, namespaces, zones, and/or similar storage space allocations for storage device 500. For example, host command handler 534 may be configured to receive partition configuration commands from the host device, parse the partition configuration parameters, and pass them to partition manager 552 for allocation of storage space in non-volatile memory 520. In some embodiments, partition configurator 534.5 may enable configuration of data protection and recovery schemes for each defined partition. For example, when a new partition is defined through partition configurator 234.5, the partition configuration command may include a protection parameter that designates the new partition as a default (standard, normal, low endurance, etc.) partition 520.3 or a protected (high protection, high endurance, high priority, etc.) partition 520.4.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage interface 516. For example, storage interface protocol 532 may include USB, SD, SDXC, PCIe, NVMe, and/or other protocol compliant communication, command, and syntax functions, procedures, and data structures for establishing host data channel 532.1. In some embodiments, host interface 530 may include a host command handler 534 configured to process the host commands received through storage interface protocol 532, initiate storage manager 540 for storage operations, and provide a response to the processed host commands. In some embodiments, host interface 530 may include additional modules (not shown) for buffer management, storage device configuration and management, and other host-side functions.

Network channel interface 536 may include an interface protocol and/or set of functions, parameters, and/or data structures for receiving, parsing, responding to, and otherwise managing data transfer between storage device 500 and a network storage system and data backup and recovery services thereon. For example, network channel interface 536 may enable storage device 500 to establish a secure data transfer connection with the network storage system separate from the host data channel used for data transfer with the host device. In some embodiments, network channel interface 536 may include or access computing and/or network resources of both storage device 500 and a host system. For example, one or more functions of network channel interface 536 may be embodied in a storage driver installed in the host system for accessing network interface resources of the host system.

In some embodiments, network channel interface 536 may include a plurality of hardware and/or software modules configured to use processor 512 and memory 514 to handle or manage defined operations of network channel interface 536. For example, host interface 530 may include a network interface protocol 536.1 configured to comply with the physical, transport, and storage application protocols supported by one or more networks for communication with a network storage system. For example, storage interface protocol 536.1 may include an internet protocol stack based around a wired or wireless network adapter built into storage device 500 or accessed through the host device, such as IP, TCP, user datagram protocol (UDP), TCP/IP, HTTP and/or other protocol compliant communication, command, and syntax functions, procedures, and data structures for establishing network data channel 536.2. In some embodiments, network channel interface 536 may be configured with a network address, such as an IP address, for storage device 500 and, in some embodiments, network channel interface 536 may rely on a network address assigned to the host system for network communications.

In some embodiments, network channel interface 536 may include a storage service interface 538 configured to initiate, access, and use a remote storage service provided by a network storage system through network data channel 536.2. For example, storage service interface 538 may be a service or function running on storage device 500 to access a cloud-based backup and recovery service providing storage on a network storage system. In some embodiments, storage service interface 538 may be selectively invoked by storage manager 540 for storage requests targeting protected partitions 520.4. In some embodiments, storage service interface 538 may include a service initiator 538.1 configured to identify a specific storage service and the network address and parameters for accessing that service. For example, service initiator 538.1 may include a cloud service identifier and a network address, such as an IP address, for connecting with the network storage system. In some embodiments, storage service interface 538 may include an encryption protocol 538.3 configured to secure communications and data transfer between storage device 500 and the network storage system. For example, encryption protocol 538.3 may include HTTPS compliant encryption parameters, certificates or keys, and/or other encryption credentials. In some embodiments, storage service interface 538 may include a service login 538.3 configured to authenticate storage device 500 to the network storage system and/or cloud storage service using one or more storage device credentials. For example, service login 538.3 may include a device identifier, password/passcode, and/or other storage device credentials, such as an authentication token recognized by the network storage system. In some embodiments, the identifiers and credentials necessary for storage device 500 to access the storage services of the network storage system may be stored in non-volatile memory 520 for exclusive use by storage device 500. For example, storage service identifier 520.6, network address 520.7, device credentials 520.8, and encryption credentials 520.9 may be stored in a hidden device configuration partition used by storage device 500 for internal configuration information and parameter tracking.

In some embodiments, storage service interface 538 may include a service failure handler 538.4 configured to manage replication and/or recovery data operations to the network storage system when a connection to the network storage system cannot be established. For example, an attempt to connect to the cloud storage service may fail for a number of reasons, including unavailability of the network, network interface, network storage system, and/or other intervening network components and/or failure to authenticate the storage device and/or encryption credentials. Service failure handler 538.4 may initially maintain a queue of write, read, erase, and/or other pending requests for the cloud service and, responsive to one or more connection errors, delays, and/or failed requests, return the service request failure status to storage manager 540 for adding an indicator, such as a replication or recovery indicator, to the metadata associated with the relevant data units. These indicators may be used by storage manager 540 to attempt the failed requests at a later time when connection with the network storage system may be re-established.

In some embodiments, storage service interface 538 may be configured to handle a variety of storage request types, such as write request 538.5, read request 538.6, and secure erase request 538.7. For example, storage service interface 538 may include logic for, responsive to storage manager 540 determining that a data unit should be replicated to the storage service, generating and sending write request 538.5 to the storage service and awaiting and handling a response message, such as a write complete response. Storage service interface 538 may include logic for, responsive to storage manager 540 determining that a target data unit should be recovered from the storage service, generating and sending read request 538.6 to the storage service and awaiting and handling a response message, such as a return of the requested target data unit. Storage service interface 538 may include logic for, responsive to storage manager 540 determining that a previously stored data unit should be erased from the storage service, generating and sending secure erase request 538.7 to the storage service and awaiting and handling a response message, such as confirmation that the data unit has been erased from the storage service. In some embodiments, storage service interface 538 may include additional command or service request sets for supporting additional storage requests and corresponding storage services from the network storage system.

In some embodiments, storage service interface 538 may be configured to support one or more predefined data unit configurations for storing data to and retrieving data from the storage service and network storage system. For example, storage service interface 538 may be configured to use host data blocks and corresponding host LBAs or a data unit corresponding to the physical storage architecture of non-volatile memory 520, such as erase or programming blocks. In some embodiments, storage service interface 538 may include or access service block addresses 538.8. For example, service block addresses 538.8 may include the unique identifier used to designate each data unit stored to the storage service, as well as used for subsequent read, erase, and similar commands targeting those data units. In some embodiments, service block addresses 538.8 may correspond to host LBAs and parameters for managing the replicated data units may be stored in flash translation layer management 544 with the host LBA metadata. In some embodiments, service block addresses 538.8 may correspond to erase blocks and parameters for managing the replicated data units may be stored in flash translation layer management 544 with the logical to physical mapping information for non-volatile memory 520. In some embodiments, service block addresses 538.8 may use another set of unique identifiers corresponding to the requirements of the storage service and storage service interface 538 may be configured with another logical mapping table to map data units between host LBAs, physical storage locations, and/or storage service data identifiers.

Storage manager 540 may include an interface protocol and/or set of functions, parameters, and data structures for reading, writing, and deleting data units in non-volatile memory devices 520. For example, storage manager 540 may include a read/write processor 542 for executing host data operations related to host storage commands received through host interface 530. For example, PUT or write commands may be configured to write host data units to non-volatile memory devices 520 through a write processor. GET or read commands may be configured to read data from non-volatile memory devices 520 through a read processor. DELETE commands may be configured to delete data from non-volatile memory devices 520, or at least mark a data location for deletion until a future garbage collection or similar operation actually deletes the data or reallocates the physical storage location to another purpose. In some embodiments, storage manager 540 may include flash translation layer management 544, data state machine, read/write buffer management, NVM device interface protocols, NVM device configuration/management/maintenance, and other device-side functions. For example, FTL management 544 may maintain mapping information and other metadata related to data units stored in non-volatile memory 520, such as host LBA tables, logical-to-physical (L2P) mapping tables, and similar information for locating and accessing the physical storage location for data based on another unique data identifier. Storage manager 540 may include a garbage collector configured to consolidate valid data units into new programming blocks to enable invalid data units to be erased and allow their programming blocks to be reused. For example, the garbage collector may include logic for selecting programming blocks to be collected based on various data parameters, such as data age, valid fragment count, available capacity, etc., and may determine or access data and operating parameters related to such logic.

In some embodiments, unrecoverable ECC handler 546 may be configured to receive unrecoverable data errors 546.1 from ECC engine 560. For example, responsive to read/write processor 542 attempting to read a target host data block from non-volatile memory 520, ECC engine 560 may return unrecoverable data error 546.1 to warn that the host data block or a subunit thereof was not successfully read. In some embodiments, unrecoverable data error 546.1 may trigger data recovery logic 546.2. For example, data recovery logic 546.2 may evaluate whether the failed data unit is from protected partition 520.4 or otherwise indicated as qualifying for high protection with a backup copy stored to the storage service. If the failed data unit, such as a particular erase block in which one or more symbols could not be recovered, has previously been replicated to the storage service, data recovery logic 546.2 may initiate a request for the replicated copy through storage service interface 538. In some embodiments, data recovery logic 546.2 may include a plurality of data recovery steps responsive to an initial UECC error from ECC engine 560. For example, data recovery logic 546.2 may include a series of retries, invoking heroic recovery mode 566, and/or use of recovery through storage service interface 538 for qualifying data units.

In some embodiments, storage manager 540 may include a recovered data rewriter 548 configured to rewrite data units recovered through storage service interface 538 to non-volatile memory 520 and update host LBA mapping through FTL management 544 to reflect the new physical storage location. For example, recovered data rewriter 548 may respond to the return of recovered data units from storage service interface 538 by initiating a new write of the recovered data unit through read/write processor 542.

In some embodiments, storage manager 540 may include a recovery indicator manager 550 configured to maintain metadata information for data units involved in replication to and recovery from the storage service, such as data units stored in protected partition 520.4. For example, recovery indicator manager 550 may determine that a new write qualifies for replication, add a replication tag or similar replication indicator to the metadata for the target data unit, and pass the write request to storage service interface 538. Similarly, recovery indicator manager 550 may receive notification from unrecoverable ECC handler 546 that a data unit needs to be recovered, add a recovery tag or similar recovery indicator to the metadata for the failed data unit, and pass the recovery request to storage service interface 538. In some embodiments, storage service interface 538 may be invoked in the read and write paths of storage manager 540 and recovery indicator manager 550 may be invoked responsive to a service failure at a first time indicated by service failure handler 538.4. For example, the data unit in the write or read request to the storage service that failed during the initial storage operation may receive a replication or recovery indicator, as appropriate, and recovery indicator manager 550 may be configured to retry the write or read requests at a later time, such as in response to a later successful storage request to the storage service. Recovery indicator manager 550 may include logic for determining trigger conditions for retrying the replication or recovery operations at the later time and may remove the replication or recovery indicators that indicate that the operation has not yet been completed once an operation complete response is received by storage service interface 538.

In some embodiments, storage manager 540 may include or access a partition manager 552 configured to allocate and manage the storage spaces allocated to partitions or other logical designations. For example, partition manager 552 may receive partition configuration parameters from partition configurator 534.5 to define a plurality of partitions having different data protection levels, such as partitions 520.3 and protected partitions 520.4. In some embodiments, storage manager 540 may include or access a configuration data manager 554 configured to allocate a hidden device configuration partition for storing internal configuration and operating parameters for storage device 500. For example, configuration data manager 554 may store internal configuration parameters, non-volatile operation logs, error/status/event data, FTL metadata, and similar data, some of which may be critical to continued operation of storage device 500, in device configuration partition 520.5. In some embodiments, device configuration partition 520.5 and/or other internal data may be designated for high protection and replicated and recovered through storage service interface 538 similar to host data units stored in protected partition 520.4.

ECC engine 560 may include an interface and set of functions, parameters, and data structures for storing, reading, and otherwise managing data ECC encoded by storage device 500, such as erasure encoded data blocks stored in non-volatile memory 520. For example, ECC engine 360 may include functions for encoding a host data block into a storage device ECC encoded data block and decoding a storage device ECC encoded data block back into the original user data symbol. In some embodiments, ECC engine 560 may be included in the write path and/or read path for non-volatile memory 520 that is managed by storage manager 540. In some embodiments, the encoding and decoding functions may be placed in separate encoding engines and decoding engines with redundant and/or shared functions where similar functions are used by both encoding and decoding operations.

In some embodiments, ECC engine 560 may include a plurality of hardware and/or software modules configured to use processor 512 and memory 514 to handle or manage defined operations of ECC engine 560. For example, ECC engine 560 may include an error coding configuration 562, encoder/decoder 564, and heroic recovery mode 566.

Erasure coding configuration 562 may include functions, parameters, and/or logic for determining the operations used to encode and decode those host data blocks in accordance with a storage device ECC configuration. For example, various ECC coding algorithms exist for providing forward error correction based on transforming a message of a certain number of symbols into a longer message of more symbols such that the original message can be recovered from a subset of the encoded symbols and related parity data. In some embodiments, a message may be split into a fixed number of symbols and these symbols are used as input for ECC coding. The ECC coding algorithm may generate a fixed amount of additional parity data or parity symbols. The sum of these symbols may then be stored to one or more storage locations.

In some embodiments, error coding configuration 562 may enable ECC engine 560 to be configured from available ECC coding algorithms using a set of coding parameters. For example, coding algorithms may enable selection of an algorithm type, such as parity-based, low-density parity-check codes, Reed-Solomon codes, etc., and one or more coding parameters, such as number of original symbols, number of encoded symbols, code rate, reception efficiency, parity level, etc. In some embodiments, the combination of coding algorithm and coding parameters may enable calculation of a correctable bit error rate (BER) for the storage device ECC configuration. For example, correctable BER may be the number of bit errors in a host data block that can be completely recovered using the storage device ECC configuration.

Encoder/decoder 564 may include hardware and/or software encoders and decoders for implementing error coding configuration 562. For example, encoder/decoder 564 may include a plurality of register-based encoders and decoders for calculating parity for a symbol and returning ECC encoded data symbols. In some embodiments, encoder/decoder 564 may be integrated in the write path and read path respectively such that data to be written to storage media and read from storage media pass through encoder/decoder 564 for encoding and decoding in accordance with storage device error coding configuration 562.

In some embodiments, ECC engine 560 may include or enable a heroic recovery mode 566. For example, heroic recovery mode 566 may implement one or more recovery retry schemes in additional attempts to recover host data where the initial host data read exceeded correctable BER of storage device error coding configuration 562. In some embodiments, one or more additional error recovery modes may include varying physical read parameters (e.g., read voltages, timing, etc.). Heroic recovery mode 568 may require additional time and processor use by ECC engine 560 and may adversely affect latency, input/output operation rate, and quality of service metrics. In some embodiments, heroic recovery mode 566 may be selectively disabled for data units that are recoverable through storage service interface 538.

Figure 6:
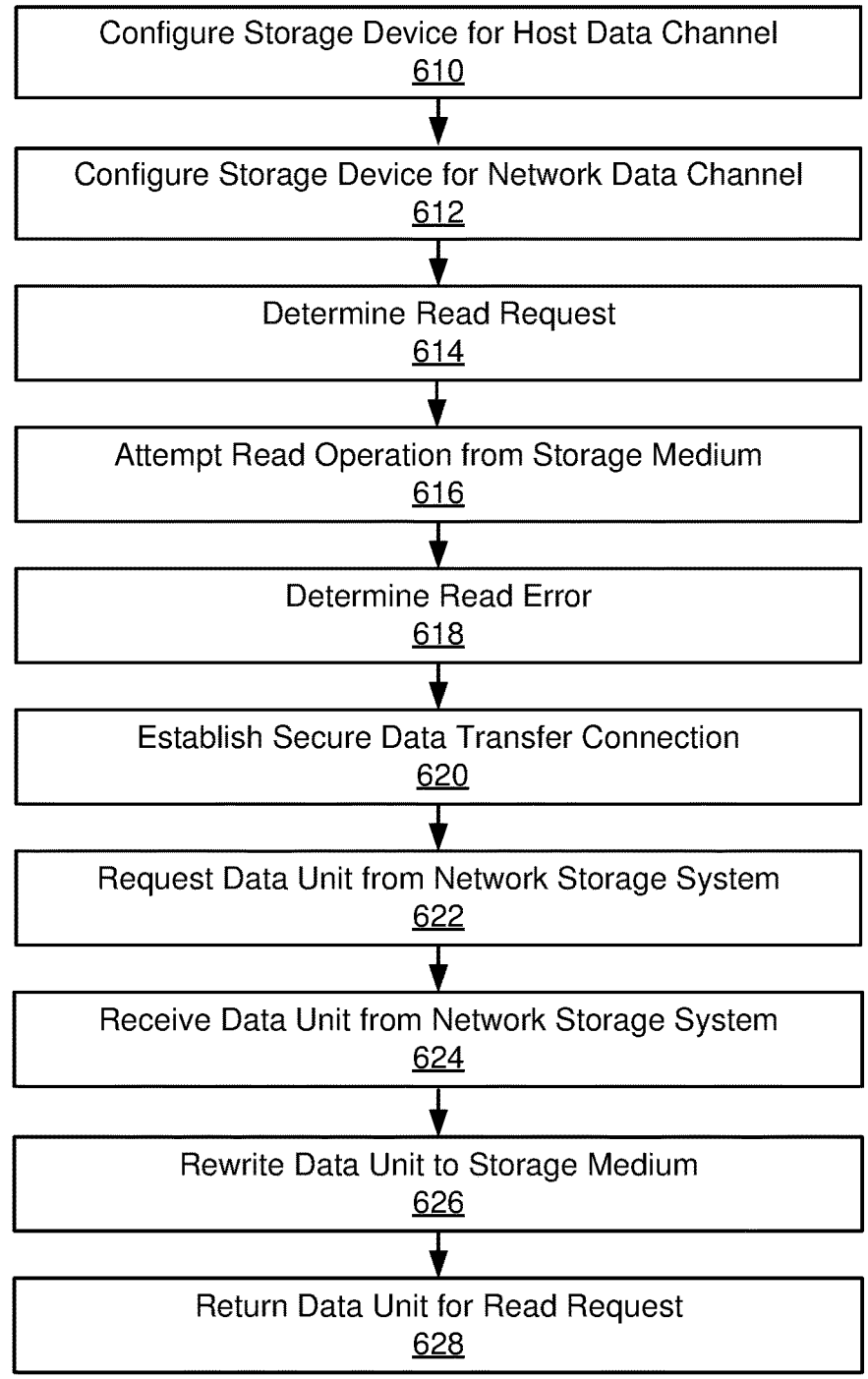
FIG. 6 is a flowchart of an example method of data recovery from a network storage system.

As shown in FIG. 6, storage device 500 may be operated according to an example method for data recovery from a network storage system, i.e., according to method 600 illustrated by blocks 610-628 in FIG. 6.

At block 610, a storage device is configured for a host data channel. For example, when a storage device is connected to a storage interface of a host system, storage device firmware and/or a storage driver in the host system may initiate a storage interface protocol to enable transfer of host commands and host data between the storage device and the host system.

At block 612, the storage device is configured for a network data channel. For example, the storage device may include a built-in wired or wireless network interface that bypasses the host device or use a network interface protocol in the storage driver to access a host network interface to establish network communications.

At block 614, the storage device may determine a read request. For example, the storage device may generate a read request in response to a read command received from the host system or based on its own internal maintenance operations.

At block 616, the storage device may attempt a read operation for target data from its storage medium. For example, the storage device may initiate a read operation through a read path configured to retrieve the target data unit from a storage location in the storage medium.

At block 618, the storage device may determine a read error. For example, responsive to the attempt to read the target data unit, an ECC engine may return an error message indicating that an unrecoverable ECC error has been encounter for one or more data symbols in the target data unit.

At block 620, the storage device may establish a secure data transfer connection with a network storage system through the network data channel. For example, the storage device may initiate a secure connection through the network data channel configured at block 612 and authenticate itself to the network storage system.

At block 622, the storage device may request a data unit from the network storage system. For example, responsive to the UECC error, the storage device may request a recovery data unit that includes the data that could not be recovered from the storage medium (e.g., the symbol or symbols that could not be recovered from the read operation attempted at block 616).

At block 624, the requested recovery data unit may be received by the storage device from the network storage system. For example, responsive to the request at block 622, the storage device may receive the recovered data unit from the network storage system over the network data channel.

At block 626, the storage device may rewrite the recovered data unit in its storage medium. For example, the storage device my execute a write operation to the storage medium using the recovered data unit and update the FTL to reflect the change in the physical location of the rewritten data.

At block 628, the storage device may return the recovered data unit. For example, the storage device may return the recovered data unit through the host data channel to the host device or return it to a requesting internal process for maintenance operations.

Figure 7:
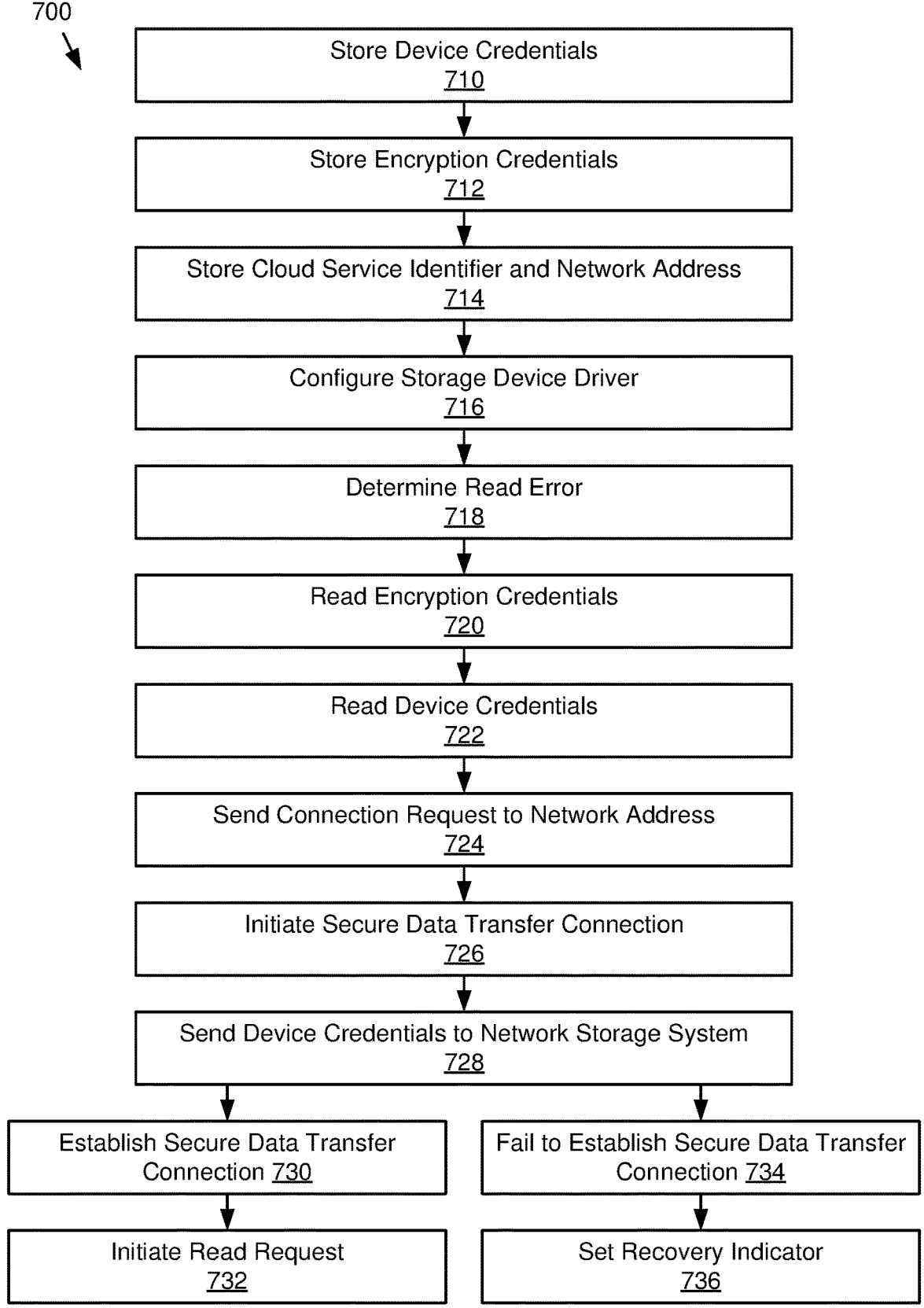
FIG. 7 is a flowchart of an example method of establishing a secure data transfer connection with a network storage system.

As shown in FIG. 7, storage device 500 may be operated according to an example method for establishing a secure data transfer connection with a network storage system, i.e., according to method 700 illustrated by blocks 710-736 in FIG. 7.

At block 710, device credentials may be stored. For example, device credentials including a storage device identifier and/or other storage device authentication information for accessing the network storage system may be stored in the storage device during device manufacture or a later device configuration event.

At block 712, encryption credentials may be stored. For example, encryption credentials including an encryption certificate, encryption key, and/or other information for establishing encrypted communication with the network storage system may be stored in the storage device during device manufacture or a later device configuration event.

At block 714, a cloud service identifier and network address may be stored. For example, the network storage system may include a cloud storage service interface that may reachable over a network using the cloud service identifier and/or network address, such as a web universal resource locator (URL) and/or IP address, and the cloud service identifier and network address may be stored in the storage device during device manufacture or a later device configuration event.

At block 716, a storage device driver may be configured for the storage device. For example, the storage device driver may be installed in the host system to enable access to the storage device through a storage interface and configured based on the version, features, and configuration of the storage device.

At block 718, the storage device may determine a read error. For example, responsive to the attempt to read a target data unit from the storage medium of the storage device, an ECC engine may return an error message indicating that an unrecoverable ECC error has been encounter for one or more data symbols in the target data unit.

At block 720, the encryption credentials may be read from the storage device. For example, the encryption credentials stored at block 712 may be read from the storage medium, such as from the configuration data partition in the storage medium.

At block 722, the device credentials may be read from the storage device. For example, the device credentials stored at block 710 may be read from the storage medium, such as from the configuration data partition in the storage medium.

At block 724, a connection request may be sent to the network address. For example, the storage device may use network protocols, such as HTTPS, to establish a secure network connection to the network address.

At block 726, a secure data transfer connection may be initiated. For example, the network storage system may respond using similar network protocols to establish encrypted communications between the storage device and the network storage system that the host system and/or other intermediaries are not able to decrypt.

At block 728, the device credentials may be sent to the network storage system. For example, the storage device may send the device credentials read at a block 722 to the network storage system for authentication of the storage device identifier and access to corresponding storage services and/or storage space in the network storage system.

At block 730, the secure data transfer connection may be established. For example, the storage device may be successfully authenticated over the secure network connection and a response message may be provided by the network storage system to the storage device.

At block 732, a read request may be initiated. For example, responsive to the UECC error, the storage device may request a recovery data unit that includes the data that could not be recovered from the storage medium (e.g., the symbol or symbols that could not be recovered at block 718). In some embodiments, establishing the secure data transfer connection as described for method 700 may be used in conjunction with method 600 of FIG. 6.

At block 734, the secure data transfer connection may fail to be established. For example, the network may be unavailable, the network storage service may not respond at the stored network address, expired encryption certificates or other protocol errors may cause the secure connection to fail, the storage device credentials may fail to authenticate, and/or other errors may prevent access to the network storage system, resulting in the storage device being (at least temporarily) unable to connect to the network storage device for one or more recovery read requests during a network or other service interruption.

At block 736, a recovery indicator may be set for the failed data units. For example, the data units impacted by the read error may be flagged as unrecoverable from the storage medium and not yet recovered so that the storage device may retry the connection and recovery read process at a later time.

Figure 8:
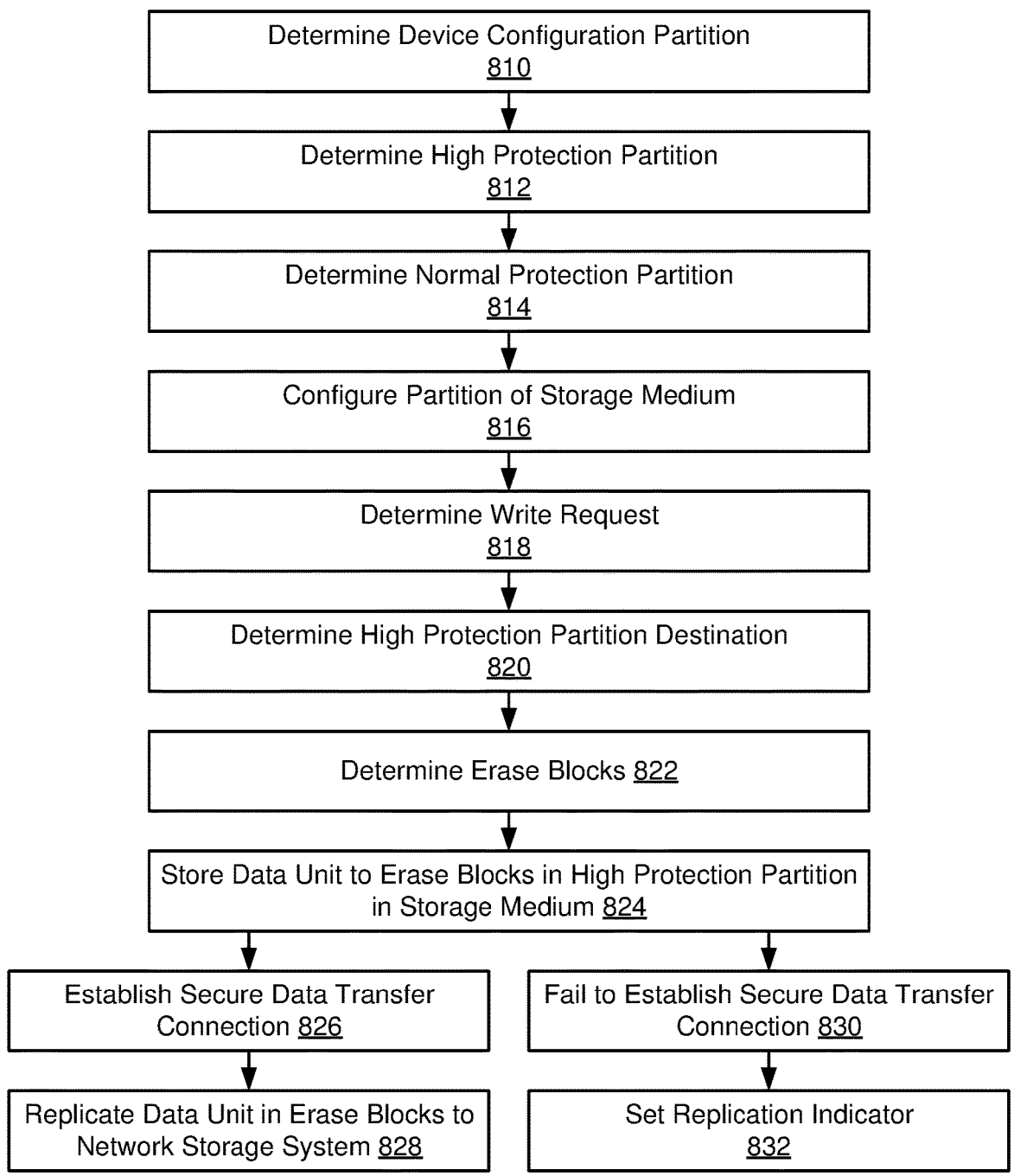
FIG. 8 is a flowchart of an example method of replicating data to a network storage system.

As shown in FIG. 8, storage device 500 may be operated according to an example method for replicating data to a network storage system, i.e., according to method 800 illustrated by blocks 810-832 in FIG. 8.

At block 810, a device configuration partition may be determined. For example, the storage device may be configured with a hidden partition in the storage medium for use by the storage device to store internal configuration and operating parameters during device manufacturing or a later configuration event.

At block 812, a high protection partition may be determined. For example, the host system may configure one or more partitions in the storage device and designate one or more of them for storing high protection host data.

At block 814, a normal protection partition may be determined. For example, the host system may designate one or more of the partitions for storing normal protection data and/or all partitions not designated as high protection partitions may default to normal protection partitions.

At block 816, the partitions may be configured in the storage medium. For example, based on the partitions defined in blocks 810-816, the storage device may allocate physical storage space in the storage medium to each configured partition.

At block 818, a write request may be determined. For example, the storage device may generate a write request in response to a write command received from the host system or based on its own internal maintenance operations.

At block 820, a high protection partition may be determined. For example, the storage device may determine that the write request is targeted to a high protection partition configured at blocks 812 and 816 based on the host LBA or other parameters of the write command.

At block 822, one or more erase blocks for the target data unit may be determined. For example, the write may include data that is to be stored into one or more erase blocks in the storage medium of the storage device by programming each erase block with the appropriate set of data (encoded in a plurality of ECC symbols).

At block 824, the target data unit may be stored in erase blocks in a high protection partition of the storage medium. For example, the storage device may write the target data unit to the high protection partition determined at block 820 in one or more erase blocks determined at block 822 to store the target data unit in the non-volatile memory of the storage device.

At block 826, a secure data transfer connection may be established. For example, the secure data transfer connection may be established responsive to the write operation similar to the establishment of the secure data transfer connection for a read operation described with regard to method 700 in FIG. 7.

At block 828, the target data unit stored to the storage medium may be replicated to the network storage system.

For example, the storage device may replicate the target data unit in accordance with the erase blocks used to store the data to the storage medium, where the storage device tracks and updates the replication data identifier and/or location based on the erase blocks in a set of service block addresses.

At block 830, the storage device may fail to establish the secure data transfer connection. For example, the network may be unavailable, the network storage service may not respond at the stored network address, expired encryption certificates or other protocol errors may cause the secure connection to fail, the storage device credentials may fail to authenticate, and/or other errors may prevent access to the network storage system, resulting in the storage device being (at least temporarily) unable to connect to the network storage device for one or more replication write requests during a network or other service interruption.

At block 832, a replication indicator may be set for the failed data units. For example, the data units written to the high protection partition may be flagged as not yet replicated so that the storage device may retry the connection and replication write process at a later time.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A data storage device comprising:
   a storage medium;
   a host data channel configured for data transfer with a host system;
   a network data channel configured for data transfer with a network storage system over a network; and
   a storage device controller, comprising at least one processor and at least one memory, the at least one processor configured to, alone or in combination:
      determine a high protection partition in the storage medium;
      determine a write request for a target data unit in the high protection partition;
      store the target data unit in the high protection partition in the storage medium;
      establish a secure data transfer connection to the network storage system over the network data channel;
      replicate, responsive to establishing the secure data transfer connection, the target data unit to the network storage system;
      determine a read request for the target data unit;
      determine, responsive to attempting to read the target data unit from the storage medium, a read error for the target data unit;
      request, over the secure data transfer connection, the target data unit from the network storage system;
      receive, over the secure data transfer connection, the target data unit from the network storage system;
      rewrite the target data unit to the storage medium; and
      return, responsive to the read request and the received target data unit, the target data unit.

2. The data storage device of claim 1, wherein:
   the at least one processor is further configured to, alone or in combination:
      store device credentials for authenticating access to the network storage system; and
      store encryption credentials for establishing the secure data transfer connection; and
   establishing the secure data transfer connection includes:
      reading the encryption credentials;
      initiating, using the encryption credentials, the secure data transfer connection with the network storage system;
      reading the device credentials; and
      sending the device credentials to the network storage system to authenticate access to the target data unit stored in the network storage system.

3. The data storage device of claim 2, wherein the storage medium comprises a device configuration partition configured to store the device credentials and the encryption credentials.

4. The data storage device of claim 2, wherein the at least one processor is further configured to, alone or in combination, store a network address for the network storage system.

5. The data storage device of claim 2, wherein the at least one processor is further configured to, alone or in combination, prevent access to the device credentials and the encryption credentials by the host system.

6. The data storage device of claim 1, further comprising:
a network interface configured to:
connect to the network for the network data channel; and
extablish a direct secure data transfer connection between the data storage device and the network storage system that is separate from the host data channel, wherein establishing the direct secure data transfer connection with the network storage system bypasses the host system.

7. The data storage device of claim 1, wherein:
the at least one processor is further configured to, alone or in combination:
store data units to the storage medium in erase blocks; and
selectively replicate data units in erase blocks to the network storage system; and
requesting the target data unit from the network storage system includes requesting a target erase block that includes at least a portion of the target data unit.

8. The data storage device of claim 1, wherein:
the read request is a host read request;
the target data unit is a host data unit; and
the at least one processor is further configured to alone or in combination, return, responsive to the read request and the received target data unit, the received target data unit to the host system prior to rewriting the target data unit to the storage medium.

9. The data storage device of claim 1, wherein:
establishing the secure data transfer connection fails at a first time;
the first time is responsive to the read request; and
the at least one processor is further configured to, alone or in combination:
set, responsive to failing to establish the secure data transfer connection at the first time, a recovery indicator for the target data unit;
establish, at a second time after the first time, the secure data transfer connection; and
initiate, responsive to establishing the secure data transfer connection at the second time, the request for the target data unit from the network storage system.

10. The data storage device of claim 1, wherein the at least one processor is further configured to, alone or in combination:
terminate, responsive to replacing the target data unit to the network storage system, the secure data transfer connection; and
establish, responsive to determining the read error for the target data unit and prior to requesting the target data unit from the network storage system, the secure data transfer connection.

11. A computer-implemented method, comprising:
configuring a data storage device for data transfer with a host system over a host data channel, wherein the data storage device includes a storage medium;
determining, by the data storage device, a high protection partition in the storage medium;
determining, by the data storage device, a write request for a target data unit in the high protection partition;
storing, by the data storage device, the target data unit in the high protection partition in the storage medium;
establishing, from the data storage device, a secure data transfer connection to a network storage system over a network data channel;
replicating, by the data storage device and responsive to establishing a secure data transfer connection, the target data unit to the network storage system,
determining, by the data storage device, a read request for the target data unit stored in the storage medium;
determining, by the data storage device and responsove to attempting to read the target data unit from the storage medium, a read error for the target data unit;
requesting, by the data storage device and over the secure data transfer connection, the target data unit from the network storage system;
receiving, by the data storage device and over the secure data transfer connection, the target data unit from the network storage system;
rewriting, by the data storage device, the target data unit to the storage medium; and
returning, responsive to the read request and the received target data unit, the target data unit.

12. The computer-implemented method of claim 11, further comprising:
storing, by the data storage device, device credentials for authenticating access to the network storage system;
storing, by the data storage device, encryption credentials for establishing the secure data transfer connection;
reading, by the data storage device, the encryption credentials;
initiating, by the data storage device and using the encryption credentials, the secure data transfer connection with the network storage system;
reading, by the data storage device, the device credentials; and
sending, by the data storage device, the device credentials to the network storage system to authenticate access to the target data unit stored in the network storage system.

13. The computer-implemented method of claim 12, further comprising:
storing, by the data storage device, a network address for the network storage system; and
sending, by the data storage device, a connection request to the network address for the network storage system.

14. The computer-implemented method of claim 11, further comprising:
configuring a storage device driver to establish the secure data transfer connection using a network interface of the host system.

15. The computer-implemented method of claim 11, further comprising:
configuring a network interface of the data storage device for the network data channel, wherein:
the network data channel is different than the host data channel; and
establishing the secure data transfer connection with the network storage system bypasses the host system.

16. The computer-implemented method of claim 11, further comprising:
   storing, by the data storage device, data units to the storage medium in erase blocks; and
   selectively replicating, by the data storage device, data units in erase blocks to the network storage system, wherein requesting the target data unit from the network storage system includes requesting a target erase block that includes at least a portion of the target data unit.

17. The computer-implemented method of claim 11, further comprising:
   returning, by the data storage device and responsive to the received target data unit, the received target data unit to the host system prior to rewriting the target data unit to the storage medium, wherein:
      the read request is a host read request; and
      the target data unit is a host data unit.

18. The computer-implemented method of claim 11, further comprising:
   failing, by the data storage device at a first time, to establish the secure data transfer connection, wherein the first time is responsive to the read request;
   setting, by the data storage device and responsive to failing to establish the secure data transfer connection at the first time, a recovery indicator for the target data unit;
   establishing, by the data storage device and at a second time after the first time, the secure data transfer connection; and
   initiating, by the data storage device and responsive to establishing the secure data transfer connection at the second time, the request for the target data unit from the network storage system.

19. The computer-implemented method of claim 11, further comprising:
   terminating, responsive to replicating the target data unit to the network storage system, the second data transfer connection; and
   establishing, responsive to determining the read error for the target data unit and prior to requesting the target data unit from the network storage system, the secure data transfer connection.

20. A system, comprising:
a host system;
a network storage system;
a data storage device comprising:
   a storage medium;
   a host data channel configured for data transfer with the host system; and
   a network data channel configured for data transfer with the network storage system over a network;
means for determining, in the data storage device, a read request for a target data unit from the host system;
means for determining, in the data storage device and responsive to attempting to read the target data unit from the storage medium, a read error for the target data unit;
means for establishing a secure data transfer connection to the network storage system over the network data channel;
means for determining failure, by the data storage device at a first time, to establish the secure data transfer connection, wherein the first time is responsive to the read request;
means for setting, by the data storage device and responsive to failing to establish the secure data transfer connection at the first time, a recovery indicator for the target data unit;
means for establishing, by the data storage device and at a second time after the first time, the secure data transfer connection;
means for requesting, over the secure data transfer connection and responsive to establishing the secure data transfer connection at the second time, the target data unit from the network storage system;
means for receiving, over the secure data transfer connection, the target data unit from the network storage system;
means for rewriting, by the data storage device, the target data unit to the storage medium; and
means for returning, responsive to the read request and the received target data unit, the target data unit.

* * * * *